United States Patent [19]

Bauer

[11] 3,837,732
[45] Sept. 24, 1974

[54] PARTIALLY TRANSPARENT PLATES FOR INCREASED IMAGE CONTRAST

[75] Inventor: Goerge T. Bauer, Webster, N.Y.
[73] Assignee: Xerox Corporation, Rochester, N.Y.
[22] Filed: May 22, 1972
[21] Appl. No.: 255,496

Related U.S. Application Data

[63] Continuation of Ser. No. 666,213, Sept. 7, 1967, abandoned.

[52] U.S. Cl. ............ 350/235, 40/135, 88/14 AT R, 95/1.7, 355/66
[51] Int. Cl. .......................................... G02b 27/02
[58] Field of Search ............. 355/67, 11, 66, 70, 71; 350/144, 235–239, 57, 321, 288; 95/1.1; 353/65, 66, 20; 40/219; 240/41.1

[56] References Cited

UNITED STATES PATENTS

| 809,698 | 1/1906 | Kelley | 40/135 |
| 3,005,388 | 10/1961 | Limberger | 95/1.7 |
| 3,138,059 | 6/1964 | White | 88/14 AT R |

Primary Examiner—Ronald L. Wibert
Assistant Examiner—Michael J. Tokar

[57] ABSTRACT

A method and apparatus for increasing the contrast of images utilizing a partially transparent plate in close contact with a diffusely reflecting opaque image layer is disclosed.

8 Claims, 1 Drawing Figure

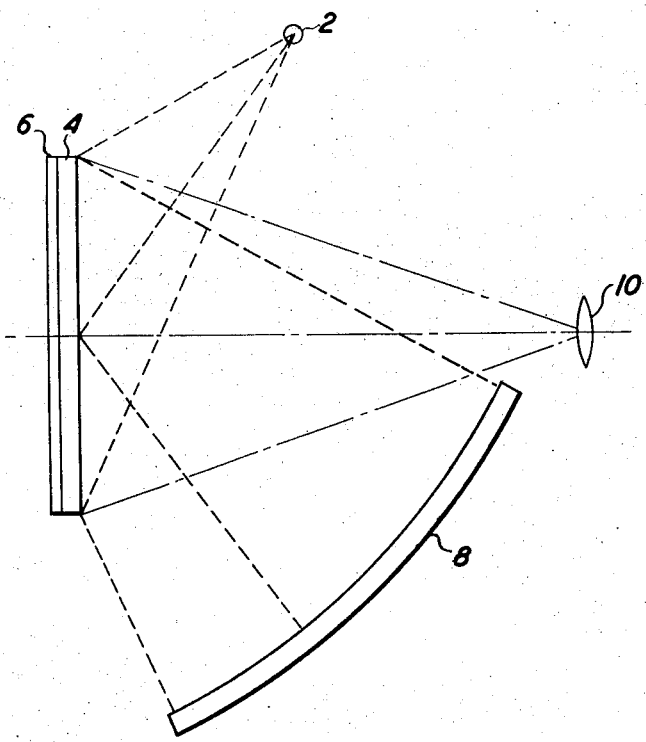

PARTIALLY TRANSPARENT PLATES FOR INCREASED IMAGE CONTRAST

This is a continuation of application Ser. No. 666,213, filed Sept. 7, 1967, and now abandoned.

BACKGROUND OF THE INVENTION

In general, the present invention relates to contrast control and more specifically to a method and apparatus for increasing the contrast of diffusely reflecting opaque images.

The prior art recognized that the contrast of images on transparent photographic film and the like may be increased by placing the film in the gap between partially transparent plates and transmitting light through that array as shown in Cloupeau's U.S. Pat. No. 2,920,527. However, the possibility of utilizing partially transparent plates to produce improved contrast in the case of diffusely reflecting opaque images has been neglected by the prior art. The discovery of the critical nature of the positioning of the light source and of the positioning of the partially transparent plate with respect to the diffusely reflecting opaque image layers are an integral part of the larger discovery that partially transparent plates may be utilized to increase the contrast of diffusely reflecting images on paper and the like by placing a single partially transparent plate upon the opaque image surface.

SUMMARY OF THE INVENTION

Accordingly, it is an object of this invention to provide a new, highly effective device and method which will overcome the deficiency of the prior art as described above.

It is a further object of the present invention to provide a device which will result in increasing the contrast of diffusely reflecting opaque images.

Another object of the present invention is to provide a method of increasing the contrast of diffusely reflective opaque images.

Yet another object of the present invention is to minimize the light losses normally associated with the use of partially transparent plates.

Other objects and a fuller understanding of the present invention may be had by referring to the following description and claims taken in conjunction with the accompanying drawing.

The present invention overcomes the deficiencies of the prior art and achieves its objectives by providing a partially transparent plate in close proximity to a diffusely reflecting opaque image-bearing layer such as paper or the like. A reduction of light losses is achieved by reflecting back into the system the incident light reflected from the first surface of the partially transparent plate.

BRIEF DESCRIPTION OF THE DRAWING

In order to facilitate the understanding of the present invention, reference will now be made to the appended drawing of a preferred embodiment of the present invention. The drawing should not be construed as limiting the invention but is exemplary only. In the drawing:

The FIGURE is a cross-sectional representation of the preferred embodiment of the present invention.

DESCRIPTION OF THE PREFERRED EMBODIMENT

A preferred embodiment of the present invention is shown in the FIGURE in which a source of light 2 illuminates a partially transparent plate 4 placed over an image on paper 6. Light which is initially reflected from the first surface of the partially transparent plate 4 may be returned to the system by a suitably curved mirror 8 which re-directs the specularly reflected rays to the system comprising the partially transparent plate 4 and paper 6. The image on paper 6 is picked-up by lens system 10 and otherwise viewed, projected, or sensed.

Any suitable positioning of light source 2 may be employed. However, the increase in contrast is optimized by a a choice of positions for the illuminating source 2 and the lens system 10 such that the directly reflected light from partially transparent plate 4 does not enter lens system 10.

While layer 6 is referred to throughout as paper any diffusely reflected opaque image bearing medium may be utilized to the same effect.

The term "partially transparent plate" is meant to describe an optical plate which reflects a portion of the incident light while allowing the remaining portion of the light to pass through the minimal absorptive losses. Such a plate may be produced by coating a glass plate with a layer having small absorption and large reflection characteristics by means of metal-evaporation, commonly referred to as "silvering." The process is by no means limited to application of silver coatings but as is well understood in the art other suitable layer such as coatings of aluminum and dielectric materials may be employed. When a metal-evaporation layer is utilized it is desirable to protect the layer of metal by a layer of any suitable hard, transparent material overcoating it. It is also possible to produce partially transparent plates by putting together two or more plates which have high refractive indices.

In the configuration shown, the silvered surface of partially transparent plate 4 is the second surface of the plate, that is, the surface at the boundary between the partially transparent plate 4 and paper 6. The reason for this choice will be made clear in the description of operation which follows.

As indicated above, lens system 10 may be the pickup lens of a microscope or telescope device for viewing the image on paper 6. Lens system 10 may also be a projection lens capable of producing a projected image of the image on paper 6 suitable for viewing on a projection screen or for the formation of a hard copy output. Lens system 10 may also be the lens of a sensor such as a photoelectric cell or other suitable means for producing an electrical analogous signal representative of the optical image on paper 6. This signal may be analyzed in its electrical form or may be re-converted to an optical image by means of an electro-optical transducer as is well known in the art.

The mirror 8 may assume any configuration and position suitable for re-directing a substantial portion of the light initially reflected from the first surface of partially transparent plate 4 back into the system. For example, a spherically curved mirror is satisfactory for the configuration shown to reflect the initially reflected rays, which would otherwise be lost, back to the partially transparent plate 4. Other curvatures may be utilized with appropriate alterations in positioning. A plurality of mirrors or a suitable integrating cavity may, also, replace the mirror 8 to achieve substantially the same result and will vary in curvature depending upon their relative positioning within the system. For optimum contrast enhancement, the portion of the re-directed light from mirror 8 which is directly reflected from the first surface of partially transparent plate 4 should be directed so as not to enter lens system 10.

For operation, the image contrast of a document 6 is enhanced by placing the document 6 in intimate or close contact with a partially reflectorized platen or plate 4. Strictly speaking, the reflection characteristics of images on paper 6 are altered; that is, the transfer characteristic of the system is changed. However, for simplicity this effect has been described throughout this application as a change of contrast or density of the image.

Of the light directed from source 2 toward the image bearing document or paper 6, a portion is reflected by the first surface of the partially transparent plate 4 in front of paper 6 while another portion of the light passes through the partially transparent plate 4 to paper 6. A portion of the light that illuminates the image on paper 6 through the partially transparent plate 4 will be reflected several times between the silvered second surface of the partially transparent plate 4 and the paper surface 6 before it passes through the partially transparent plate 4 once again. Due to the multiple reflections between the paper 6 and the plate 4, the contrast difference increases between areas of the image on paper 6 having smaller absorption (greater reflection) characteristics and those areas of the image with greater absorption (smaller reflection) characteristics.

The resolution of the system is limited by the distance between the plate 4 and the paper 6, thus the distance between the plate 4 and the paper 6 is to be minimized. In practice, the paper surface lies on the plate 6 in what may be considered substantially intimate contact, that is, the surface of the paper 6 is not more than a few thousandths of an inch, for example 0.004 inches from the adjacent plate surface and the distance is often less depending upon the fiberous structure of the paper 6.

If we let $r_1$ stand for the specular reflectivity of the plate 4 from the direction of the illuminating source 2, $r_2$ for the reflectivity of plate 4 from the other direction, that is, from the side in contact with paper 6, $t_1$ for the plate's transmission and $r_p$ for the reflectivity of the paper 6, the total reflectivity R of the plate 4 and the paper 6 is $$R = t_1^2 \, r_p/1 - r_2 r_p + r_1.$$

Since the images on paper 6 diffuse the incident light, the first term of the above equation represents the diffused light and the second term is the specularly directed light. As has been noted above for optimum conditions, the positioning of the source 2 and the pick-up lens system 10 should be such that the directed light reflected by the plate 4 does not reach lens system 10.

The ratio of the diffuse components of $\bar{R}_p$ that reach lens system 10 when a surface having a reflectivity $r_p$ is compared to another with reflectivity $r_m$ is $$\bar{R}_p/\bar{R}_m = r_p(1 - r_2 r_m)/r_m(1 - r_2 r_p).$$

If a comparison is made to an absolute white diffuse surface, such that $r_m = 1$, then $$\bar{R}_p/\bar{R}_1 = r_p(1 - r_2)/(1 - r_2 r_p).$$

The above equation describes the apparent reflectivity of the surface with reflectivity $r_p$ as it has been modified by the partially transparent plate 4. Since $\bar{R}_p/\bar{R}_1$ is not a linear function of $r_p$ it will be recognized that partially transparent plates may be utilized to increase contrast.

Since as was noted above it is desirable in order to increase contrast that any specularly reflected light from the first surface of plate 4 not reach lens system 10. This condition however results in a loss of light energy in all cases. To reduce the magnitude of light loss from the system, the reflective element 8 is provided to redirect that light back to plate 4.

The above description is illustrative of only one of many possible uses for the present discovery. Such a system will find wide use in xerographic systems, copiers, contact printing, examining medical X-rays and aerial photographs, and in increasing the amplitude contrast of microscopic objects.

The primary reason that the system described above finds such a wide range of uses is due to the surprising effectiveness that it has in increasing contrast.

A wide range of reflectances of the partially transparent plate may be utilized in conventional systems. In most instances, a partially transparent plate having a 20-80% reflective coating may be employed depending upon the amount of contrast desired and the radiometric requirements of the system, although plates having reflective coatings outside this range may be utilized for exceptional or specially designed systems.

An understanding of the basic principle of contrast enhancement involved in the present invention will be assisted by considering the following first order simplified example, (for more precise calculations the equations given above must be utilized): Considering an image area to consist of a light area which absorbs only 0.2 of the incident light and a dark area which absorbs 0.4 of the incident light, it is clear that if both areas are illuminated uniformly by say, for example, a 10 unit beam of light a single reflection will produce an output beam of 6 units from the dark area and an output beam of 8 units from the light area. The contrast ratio is thus 1.3. After the next reflection the dark area will reflect 3.6 units while the light area will reflect 6.4 units of light. And after the next reflection the dark area will reflect 2.2 units while the light area will reflect 5.1 units. The contrast ratio has, thus, by this process been increased from 1.3 to 2.3 in three reflections from the image. While this example is an oversimplification it illustrates the principle involved in the process of contrast enhancement by multiple reflections as utilized in the present invention.

This technique has the advantage of enhancing contrast of an ink by any color equally as opposed to many filter techniques known in the art for contrast control which are highly dependent upon wavelength considerations while having a comparable effect on radiometric efficiency.

Thus, in summary, the enhancement of image contrast by placing a document in intimate contact with a partially transparent plate is applicable to a wide area of uses not heretofore within the capability of the prior art.

Although a specific preferred embodiment of the present invention has been set forth in the detailed description above, the description is not intended to limit the invention to the particular forms or embodiments disclosed herein since they are to be recognized as illustrative rather than restrictive and it will be obvious to those skilled in the art that the invention is not so limited. The invention is declared to cover all changes and modifications of the specific example of the invention herein disclosed for purposes of illustration which do not constitute departures from the spirit and scope of the invention.

What is claimed is:

1. A method of increasing the contrast of an opaque image-bearing document comprising:
   1. placing the image-bearing surface of said document in intimate contact with a partially transparent plate, said plate comprising a layer of reflecting material overlying a transparent member, said image-bearing surface of said document contacting said layer of reflecting material,
   2. illuminating the image-bearing document surface through said partially transparent plate so that a portion of the light that illuminates said image surface will be reflected several times between said plate and said document surface, and
   3. picking up said light which has been reflected between said plate and said document surface by a lens system for further display.

2. An optical system for increasing the contrast of an image on one surface of an opaque diffusely reflecting document comprising:
   1. a partially transparent plate one surface of which is in intimate contact with the document surface bearing said image, said partially transparent plate comprising a layer of reflecting material overlying a transparent member, the surface of said reflecting material contacting the document surface bearing said image,
   2. a light source to illuminate said document surface through said partially transparent plate so that a portion of said light will be reflected several times between said plate and said document surface, and
   3. lens means for picking up said light which has been reflected between said plate and said document surface bearing said image for further display.

3. Apparatus for increasing the contrast of an image-bearing document comprising:
   1. a reflective layer having small light absorption characteristics,
   2. transparent means for supporting said layer, said layer accessible for intimate contact with said document,
   3. a source of light for illuminating said document while in contact with said layer through said plate and said layer, said layer having a sufficiently high reflectivity so as to reflect a substantial portion of said light reflected from said document back thereto multiple times to thereby increase the contrast between image and background areas of said document.

4. The combination recited in claim 3 further including
   a lens means for picking up said light reflected between said plate and said document.

5. The combination recited in claim 4 wherein said lens means is arranged at such an angle with respect to said plate as to avoid picking up light from said source directly reflected by said plate.

6. The combination recited in claim 3 wherein said layer reflects at least 20% of the light from the direction of said document.

7. A method of increasing the contrast of image bearing areas of a document with respect to background areas comprising,
   1. supporting said document with its image bearing surface in intimate contact with a highly reflective layer having low absorption characteristics to form a document-layer interface, and
   2. directing light toward said interface through said layer whereby multiple reflections of light take place between said document and said layer before the light exits said interface area, thereby increasing contrast.

8. The combination recited in claim 7 further including the step of
   viewing the light exiting said interface at an angle different from the angle at which light is directly reflected from the source side of said layer.

* * * * *